Oct. 26, 1943.  R. G. LE TOURNEAU  2,332,862
POWER CONTROL UNIT
Filed Jan. 31, 1942
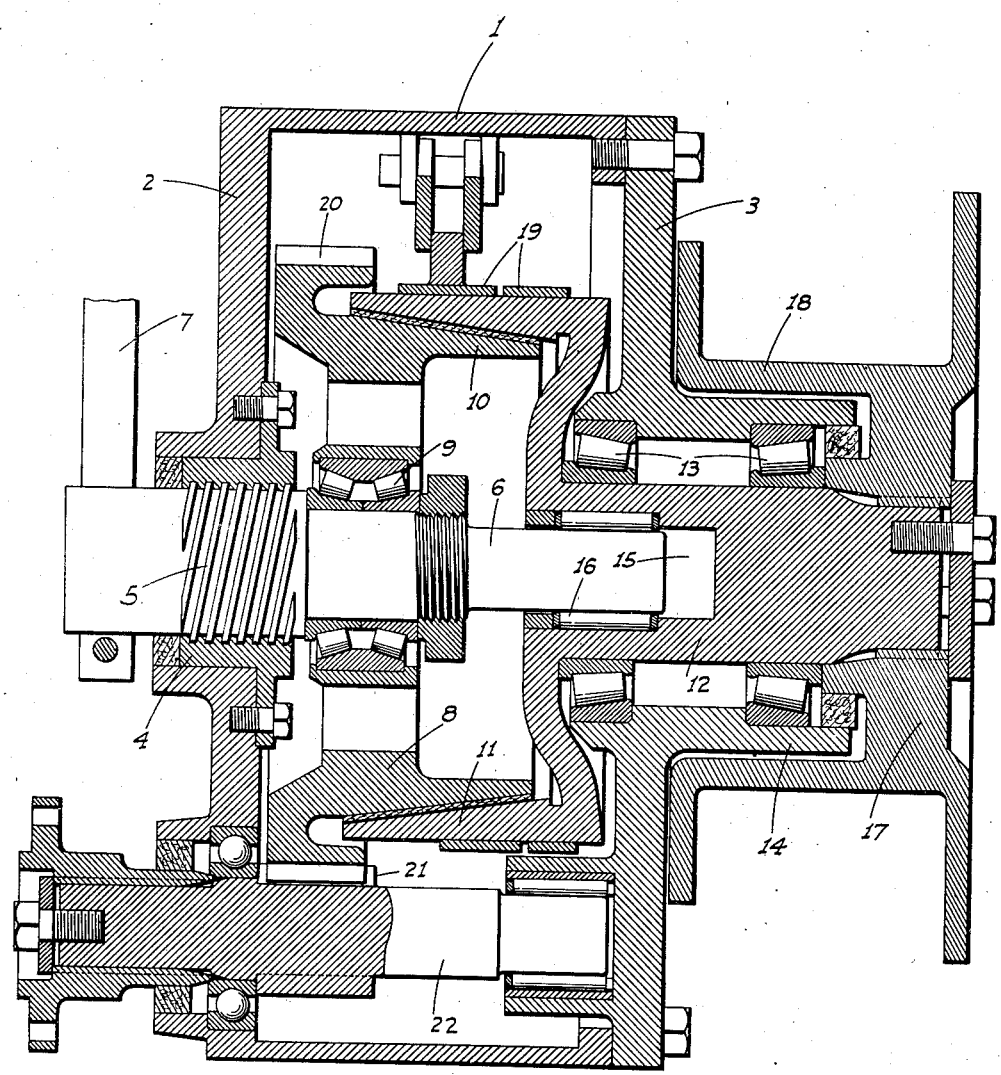
INVENTOR
R.G. LeTourneau
BY
ATTYS Patented Oct. 26, 1943

2,332,862

UNITED STATES PATENT OFFICE 2,332,862

POWER CONTROL UNIT

Robert G. Le Tourneau, Peoria, Ill., assignor to R. G. Le Tourneau, Inc., a corporation Application January 31, 1942, Serial No. 429,123

6 Claims. (Cl. 254—187)

This invention relates to power control units or power winches such as are mounted on and driven from a tractor to control the operation of an implement drawn by the tractor.

The unit of the present invention operates generally on the same principal as and represents improvements over the power control unit shown in my Patent No. 1,912,645, dated June 6, 1933; my principal object being to simplify the construction and mounting of the various parts of the unit so as to make the structure as a whole more compact, as well as avoiding the need of any framing members beyond the cable drum of the unit and which, under certain conditions of operation, interfere with the desired freedom of cable movement.

These and other objects I accomplish by means of such structure and relative arrangement of parts as will fully appear by a perusal of the following specification and claims.

The figure on the drawing is a sectional elevation of my improved power control unit.

Referring now more particularly to the characters of reference on the drawing, the numeral 1 denotes a rigid housing having end walls 2 and 3, the wall 3 being removable for ease of manufacture and assembly. Secured in the wall 2 is a tapped bushing 4 engaged by the threaded portion 5 of a shaft 6, which extends lengthwise through the housing. The shaft outwardly of the wall 2 is adapted for manual rotation as by a radial lever 7.

Turnable on the shaft within the housing and immediately beyond the threaded portion 5 is a circular member 8; antifriction bearings 9 between the member and shaft maintaining said members against axial movement along the shaft. The member 8 is formed with a male clutch element 10 of flat cone form, which extends away from the wall 2. Overhanging the element 10 is the female clutch element 11 which is formed on a relatively heavy combination hub and stub shaft 12. This shaft projects away from the wall 2 and through the wall 3, being journaled against axial movement in the latter on longitudinally spaced bearings 13 mounted in a boss 14 rigid with the wall 3 outside the housing.

The shaft 12 has a socket 15 into which the inner end of the shaft 6 slidably and turnably projects, there being antifriction bearings 16 between the shaft and socket. The shaft 12 projects beyond the boss 14 for rigid connection with the hub 17 of the cable drum 18 which overhangs the boss and extends to adjacent the wall 3 for compactness.

The external surface of the clutch element 11 forms a brake drum engaged by a brake band 19 which is preferably of the type shown in my copending application for patent, Serial No. 429,125, filed January 31, 1942; the operation of the brake and shaft 6 being coordinated by a connection therebetween, as for instance shown in my Patent No. 2,220,655 dated November 5, 1940, and which forms no part of this invention.

The member 8 is provided with a gear 20 radiating out from the clutch element 10 and overhanging the element 11 for compactness. This gear is engaged by a drive pinion 21 mounted on a shaft 22 suitably journaled in the walls 2 and 3 of the housing and projecting outwardly from the wall 2 for connection with the power take-off shaft of a tractor. The shaft 22 is held against axial movement, but the gear and pinion are of such a nature as to allow of limited axial movement of the member 8 without disturbing the driving relationship between the gear and pinion.

It will thus be seen that the shaft 12, which is supported in the housing, forms a support for the cable drum, the clutch element and brake drum, as well as for the shaft 6, thus making a very substantial and compact structure.

In operation it will be seen that rotation of the control shaft 6 in one direction or the other shifts said shaft axially due to its threaded engagement with the bushing 4, and thus shifts the drive clutch element 10 into or out of driving engagement with the female clutch element, to consequently drive the cable drum or allow the same to run free.

Although here shown as being of the ordinary spur type, the teeth of the gear and pinion are preferably cut helically, or as shown in my U. S. Patent No. 2,322,371 dated June 22, 1943.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A power control unit comprising a housing having spaced end walls, an axially shiftable driven clutch element within the housing, means to shift the element, including an axially movable shaft journaled in one end wall and on which said driven clutch element is turnable, a cooperating clutch element in the housing, a hub on said cooperationg element journaled in the other end wall, and a cable drum rigid with said hub; said hub within the housing having a socket slidably and turnably supporting the adjacent inner end of the shaft.

2. A power control unit comprising a housing having spaced end walls, a driven clutch element within the housing, a cooperating clutch element in the housing, a cable drum outside the housing beyond one end wall, an axial member connecting the drum and said cooperating clutch element, means journaling said member in said one end wall, a shaft on which said driven clutch element is turnable but held against axial movement relative thereto and a tapped bushing fixed in the other end wall, the shaft having threads engaging the bushing whereby upon rotation of the shaft the driven clutch element will be moved axially.

3. A structure as in claim 2, in which the member is provided with an axial socket open to the interior of the housing and in which the adjacent inner end of the shaft is turnably and slidably fitted.

4. In a power control unit which includes spaced supports, a pair of axially alined shafts, means journaling each shaft intermediate its ends on a corresponding one of said supports, a driven clutch element rotatably but axially immovably mounted on one shaft between said supports, a cooperating clutch element fixed on the other shaft in adjacent relation, means connected with said one shaft to effect limited rotation thereof, and cooperating means between said one shaft and the journaling means for said one shaft to cause the same to shift axially to engage or disengage said clutch elements upon limited rotation of said one shaft in one direction or the other, respectively.

5. In a power control unit which includes spaced supports, a pair of axially alined shafts, means journaling each shaft intermediate its ends on a corresponding one of said supports, a driven clutch element rotatably but axially immovably mounted on one shaft between said supports, a cooperating clutch element fixed on the other shaft in adjacent relation, and means connected with said one shaft to effect limited rotation thereof, the journaling means for said one shaft comprising a tapped bushing fixed on the corresponding support and the shaft having threads engaging in the bushing whereby upon limited rotation of said on shaft in one direction or the other to shift said one shaft axially in a direction to effect engagement or disengagement of said clutch elements.

6. A power control unit comprising a housing having opposed walls, a pair of axially alined shafts projecting through said opposed walls, means journaling said shafts in connection with corresponding walls, the inner end of one shaft slidably projecting into an axial socket in the other shaft, said other shaft being fixed against axial movement, a driven clutch element rotatably but axially immovably mounted on said one shaft within the housing, a cooperating clutch element fixed on the said other shaft within the housing in adjacent relation to said driven clutch element, and means connected with said one shaft to effect limited rotation thereof, the journaling means for said one shaft comprising a tapped bushing surrounding said one shaft and being fixed on the corresponding wall and the surrounded portion of said one shaft being threaded into said bushing whereby upon limited rotation of said one shaft in one direction or the other to shift said one shaft axially in a direction to effect engagement or disengagement of said clutch elements.

ROBERT G. LE TOURNEAU.